C. A. TEGARDEN.
LEG BAND FOR POULTRY.
APPLICATION FILED DEC. 16, 1912.
1,093,743.
Patented Apr. 21, 1914.
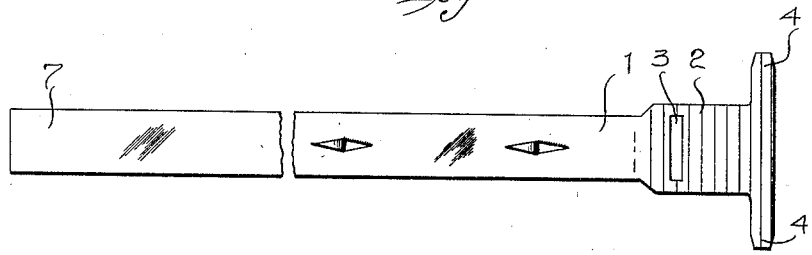
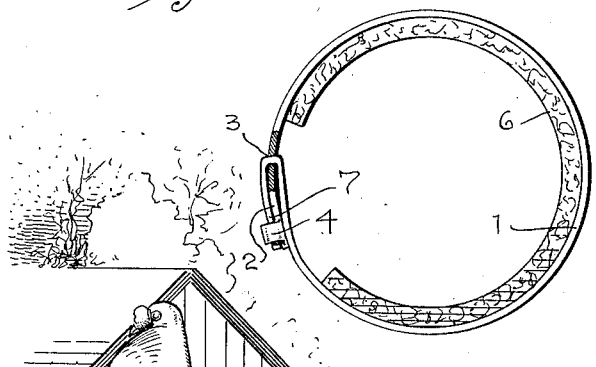
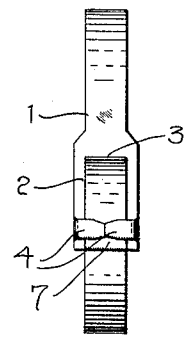
Inventor
CHARLES A. TEGARDEN

UNITED STATES PATENT OFFICE.

CHARLES A. TEGARDEN, OF COLFAX, INDIANA.

LEG-BAND FOR POULTRY.

1,093,743. Specification of Letters Patent. Patented Apr. 21, 1914.

Application filed December 16, 1912. Serial No. 737,143.

*To all whom it may concern:*

Be it known that I, CHARLES A. TEGARDEN, a citizen of the United States, residing at Colfax, in the county of Clinton and State of Indiana, have invented certain new and useful Improvements in Leg-Bands for Poultry, of which the following is a specification, reference being had to the accompanying drawings.

This invention relates to new and useful improvements in leg bands for poultry and birds and more particularly to an adjustable band of this character, the object of the invention being to provide an adjustable leg band that will fit any size bird or fowl and having letters or numerals thereon to distinguish one fowl from another.

Another object of the invention is to provide an adjustable leg band adapted to receive and retain a medicamental disinfectant so that the same comes in contact with the leg of the fowl for the purpose of preventing scaly legs and destroying lice, and other mites of this character.

Another object of the invention is to provide an adjustable leg band for poultry and birds which will possess advantages in points of efficiency and durability, is inexpensive of manufacture and at the same time is simple in construction and operation.

With the above and other objects in view, the invention consists in the novel features of construction and the combination and arrangement of parts hereinafter more fully described, pointed out in the claim and shown in the accompanying drawings, in which—

Figure 1 is a top plan view of an adjustable leg band constructed in accordance with my invention. Fig. 2 is a longitudinal sectional view. Fig. 3 is a side elevation illustrating the same in a closed position. Fig. 4 is a front elevation, and Fig. 5 is a detail view illustrating the manner of application of my improved invention.

In the construction of my improved leg band, I preferably provide an elongated body portion 1 formed of aluminum or other suitable material of this character. The body 1 is to be of sufficient resiliency to allow the same to be bent upon itself and engaged around the leg of a fowl or bird and is provided at one end with an enlarged portion 2 having a transverse slot 3 formed at the inner end thereof and provided at its outer end with the outwardly extending alined wings 4. Arranged within the inner side of the body portion of the device and secured thereto by means of the spur members 5 which are struck inwardly from the body 1 is a layer of felt or other suitable material as shown at 6 which is adapted to be saturated with any desirable medicamental disinfectant so that when the band is applied to the leg of a fowl or bird, this disinfectant will prevent various diseases to which the legs of the fowl are subject and also preventing lice and other vermin from reaching the body of the fowl.

In applying my improved leg band, the same is bent upon itself and arranged around the leg of the fowl so that the felt padding 6 is tightly applied at the same time the end 7 of the body portion is disposed through the slot 3 and bent outwardly upon the body portion 2 and disposed between the wings 4 so that when the end is in position, the wings are bent upon the same as shown in Fig. 4 to securely retain the band in position upon the leg of the fowl. It will be apparent that the device is extremely simple in construction, can be quickly and readily applied and at the same time is comparatively inexpensive of manufacture.

While I have shown and described the preferred form of my invention, it will be obvious that various changes in the details of construction and in the proportions may be resorted to for successfully carrying my invention into practice without sacrificing any of the novel features or departing from the scope of the appended claim.

What I claim is:—

A leg band for poultry including an elongated metallic body, spur members struck out from said body and arranged in spaced longitudinal alinement, a strip of felt or other suitable material arranged upon said body and engaged by the spur members to hold the same in position, said felt being adapted to be saturated with any desired medicamental disinfectant, and means for securing said band to the leg of a fowl.

In testimony whereof I hereunto affix my signature in the presence of two witnesses.

CHARLES A. TEGARDEN.

Witnesses:
HENRY O. HUDDLESTON,
HAZEL E. HUDDLESTON.